FIG. I
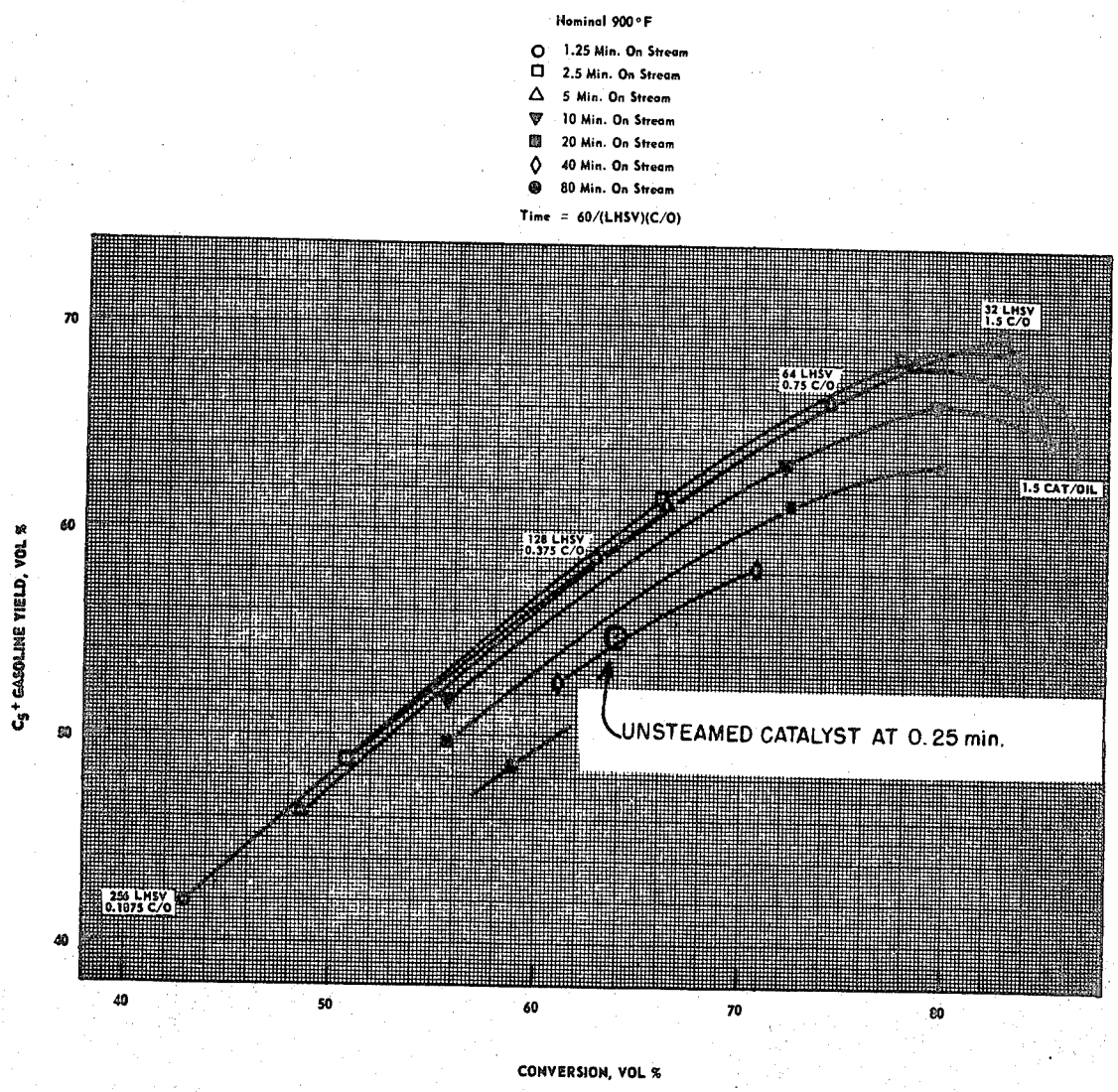
EFFECTS OF CATALYST RESIDENCE TIME ON GASOLINE YIELD DURING CRACKING OVER 30-60 MESH REY
Inventors
Wilbur K. Leaman
Charles J. Plank
Bohdan W. Wojciechowski
BY
Agent

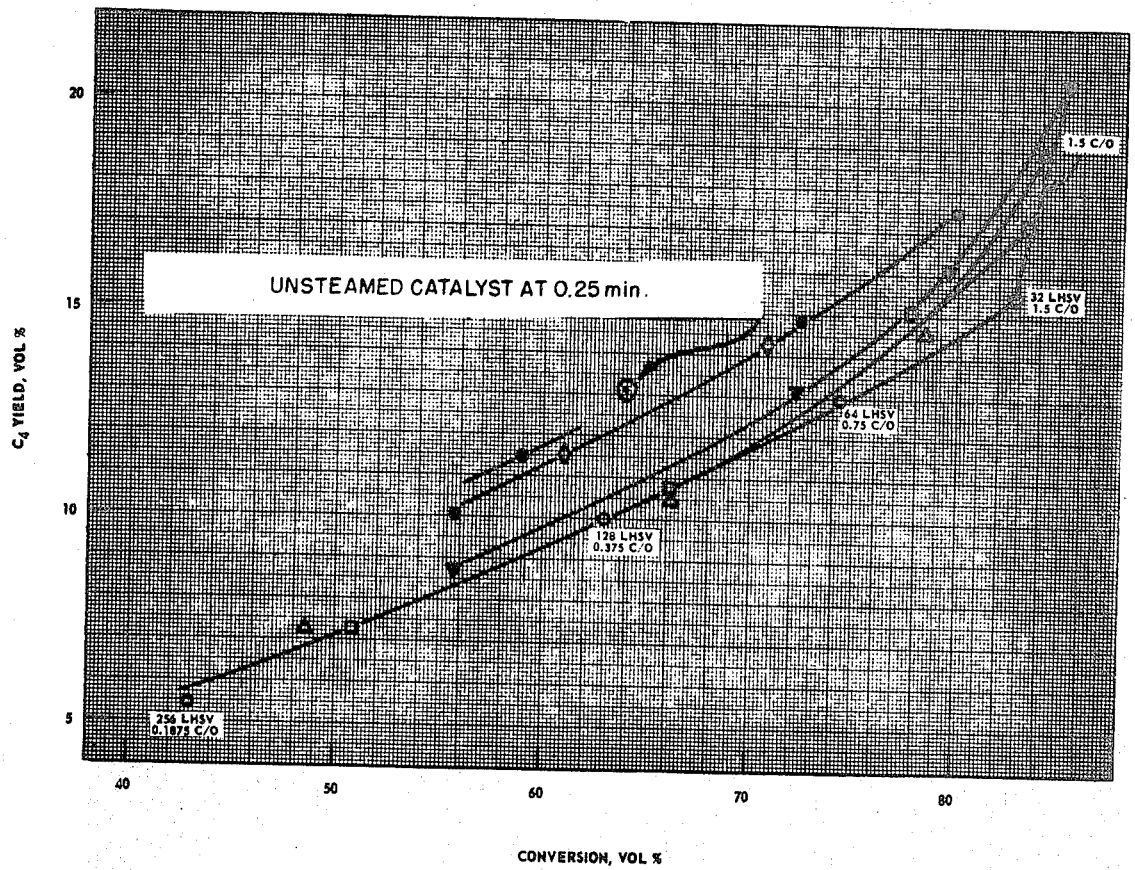

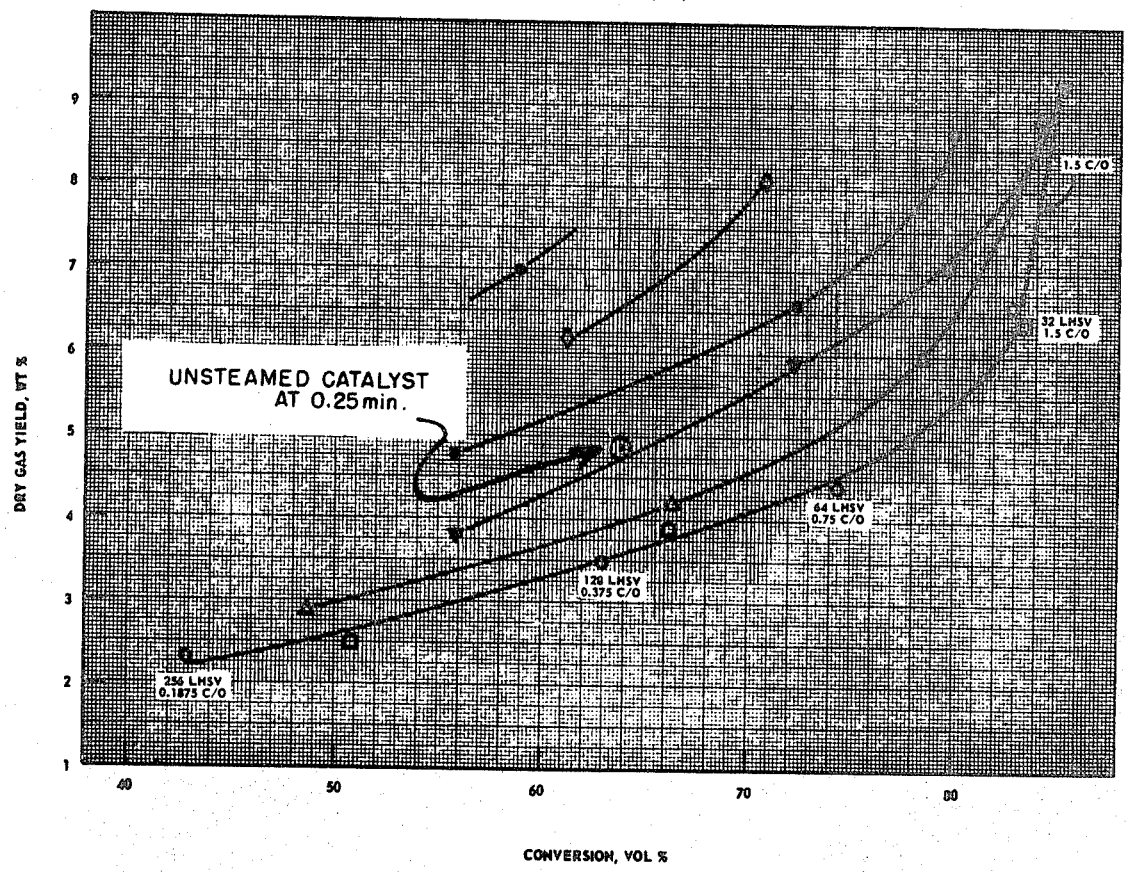

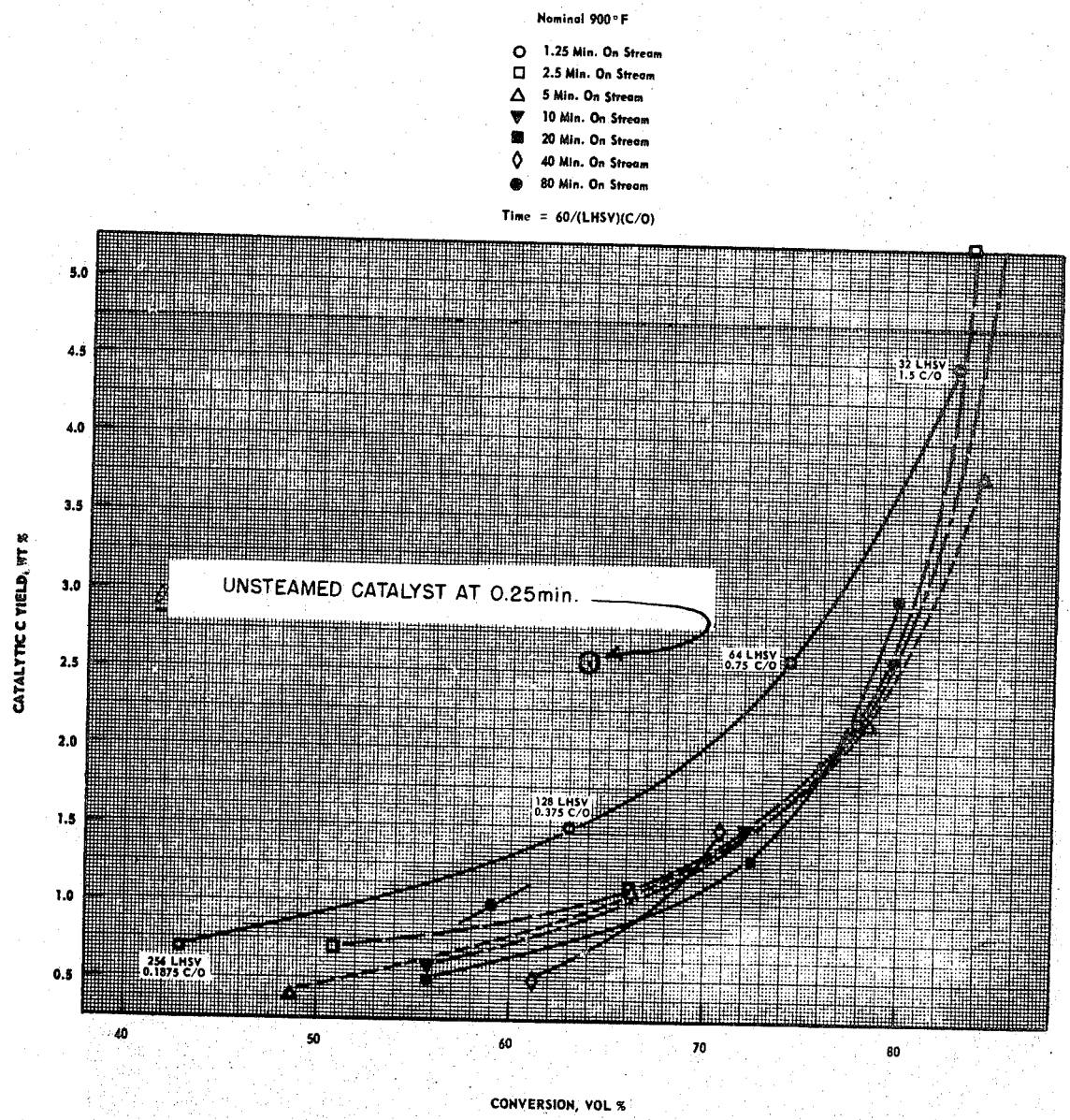

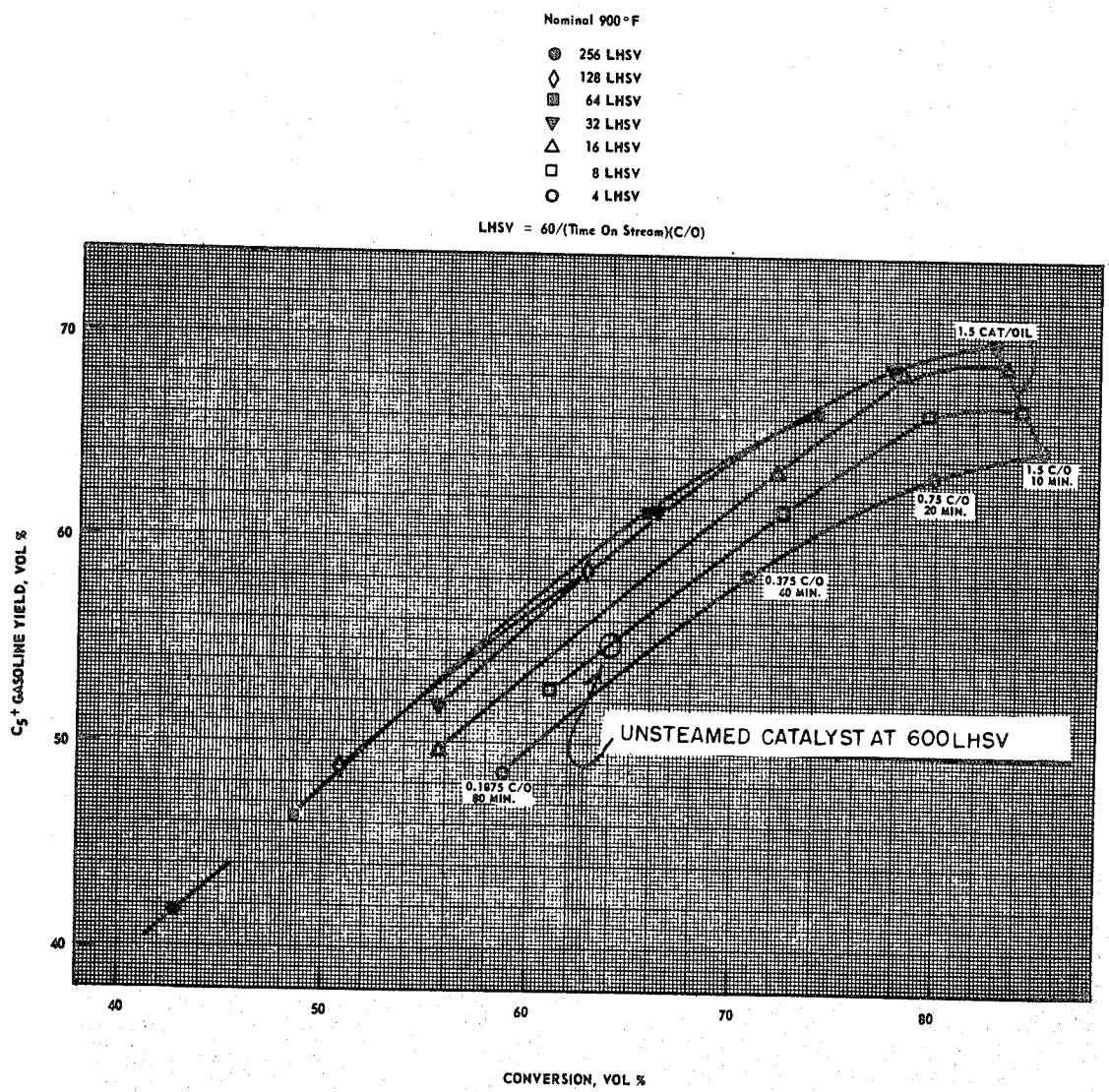

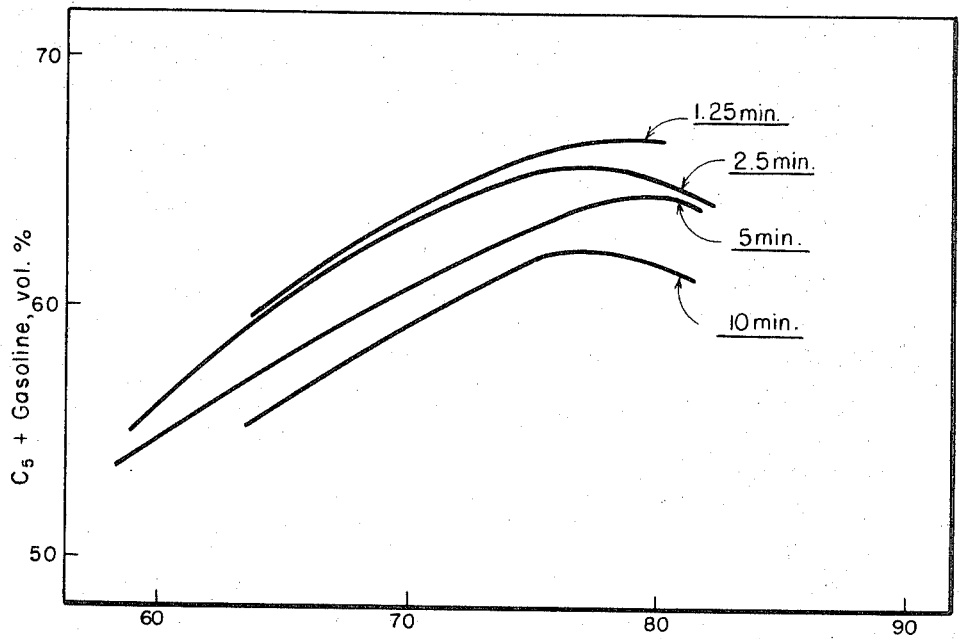
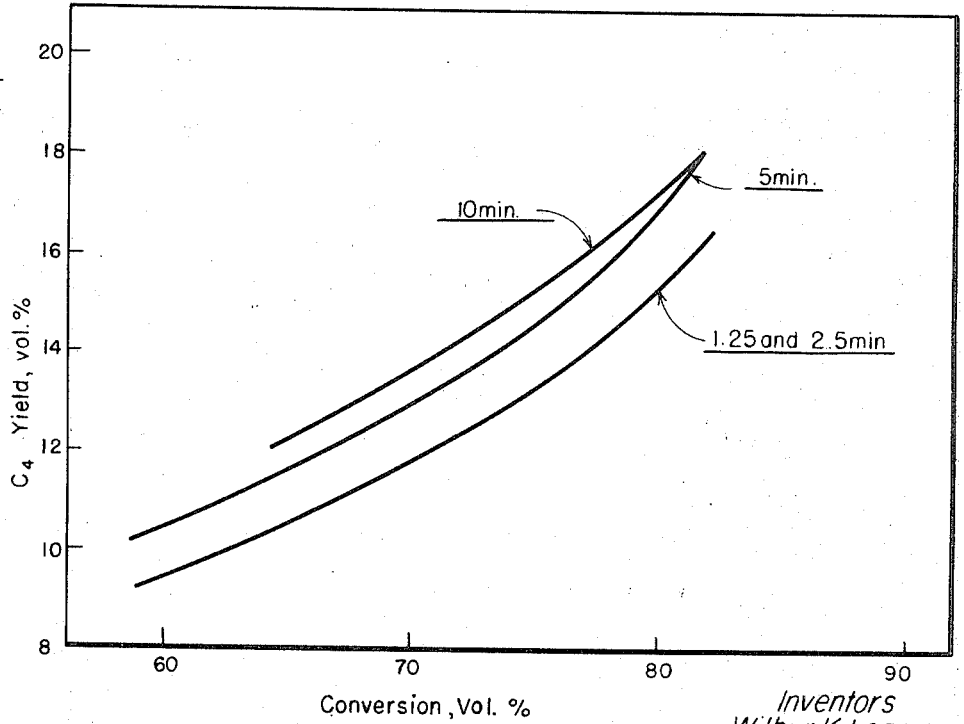

EFFECTS OF CATALYST RESIDENCE TIME ON DRY GAS AND COKE YIELDS DURING CRACKING OVER 30-60 MESH REY(10%) IN SILICA MATRIX CATALYST
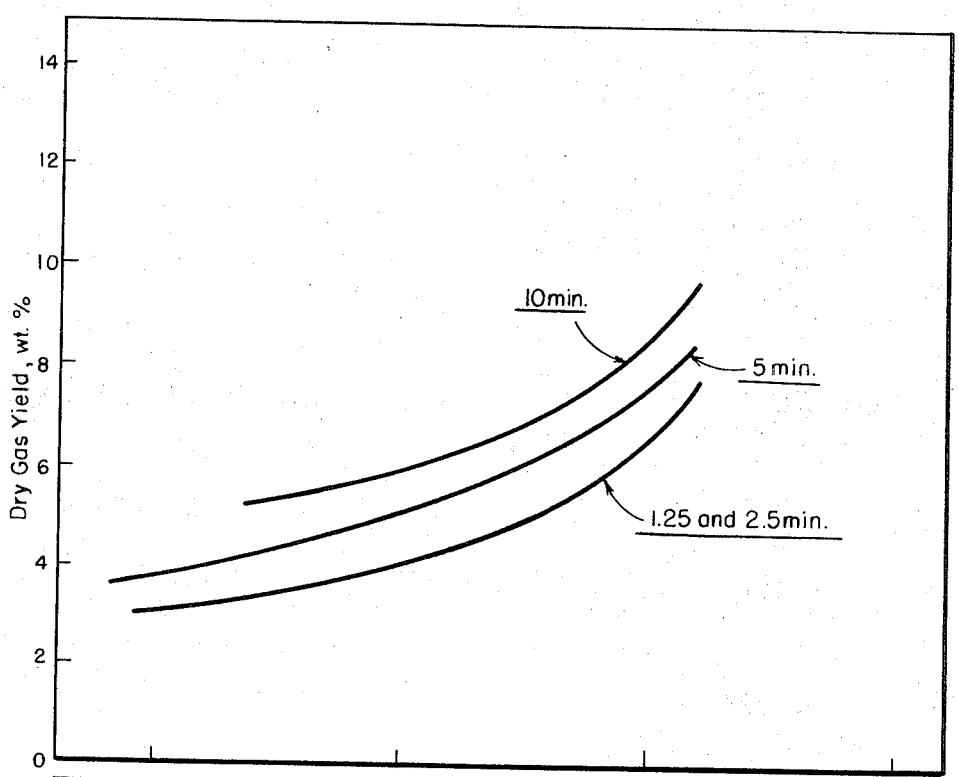
FIG. VIII
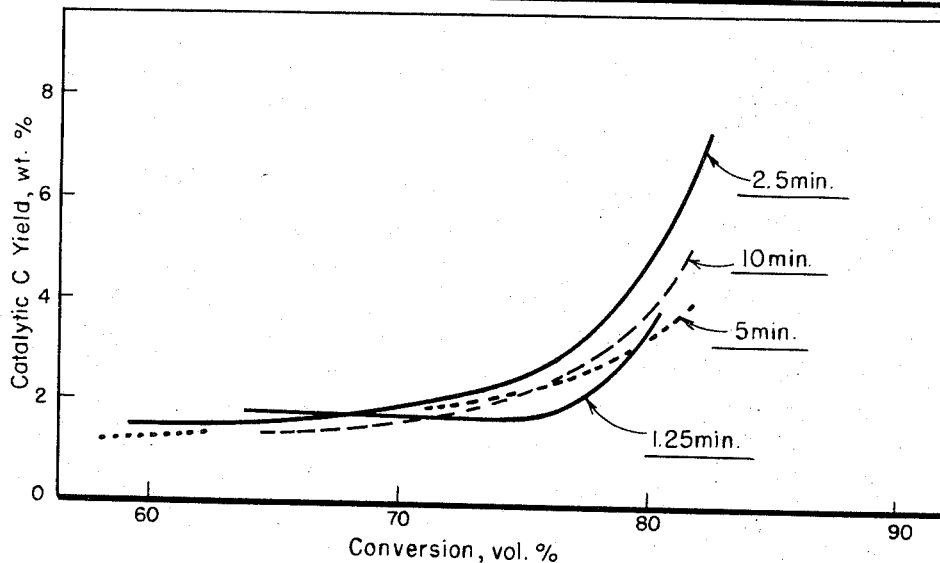
FIG. IX
Inventors
Wilbur K. Leaman
Charles J. Plank
Bohdan W. Wojciechowski
By
Agent

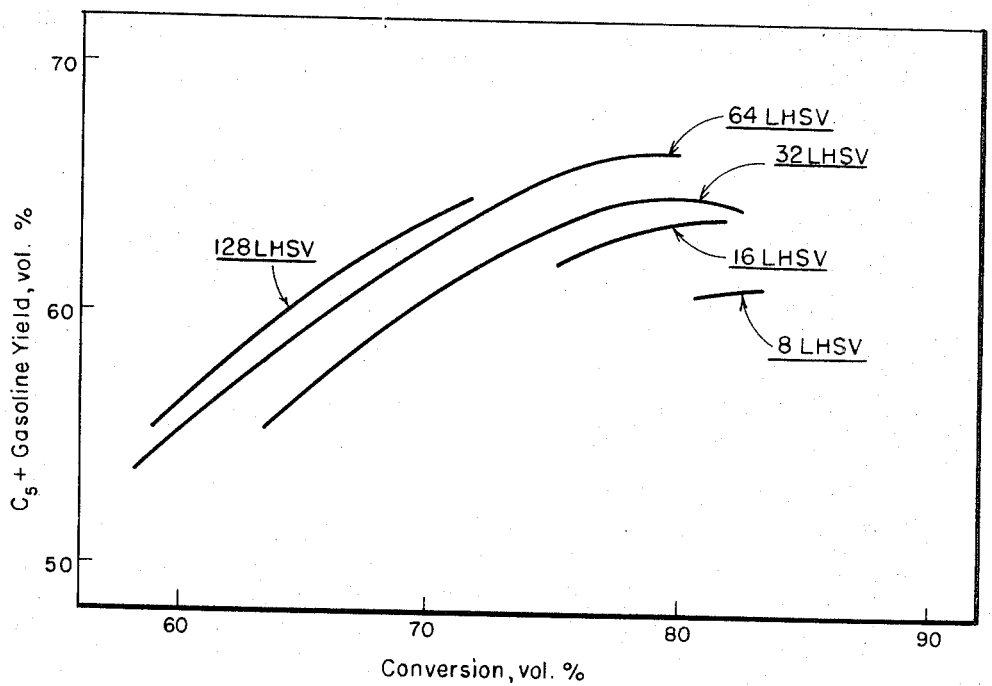

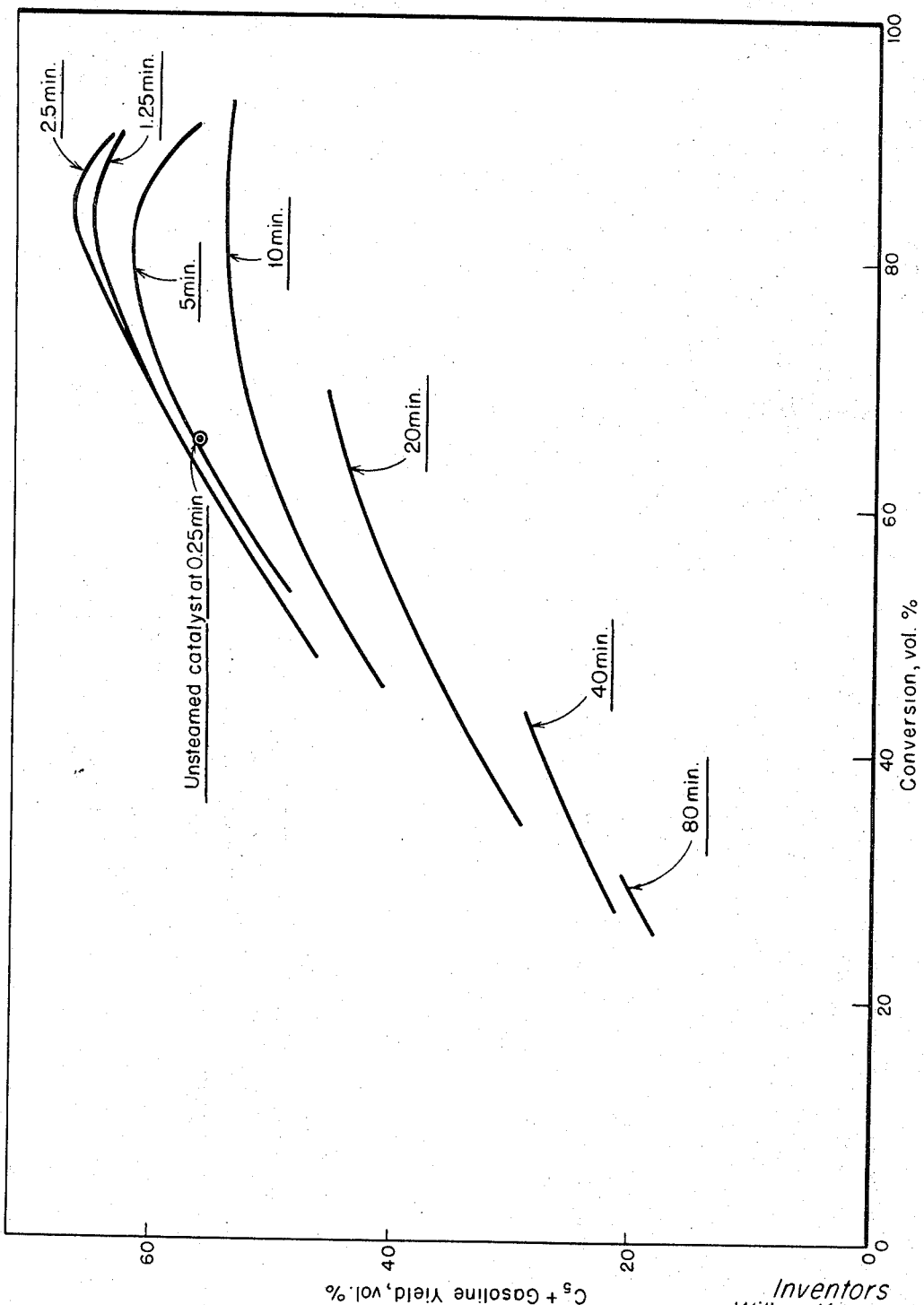

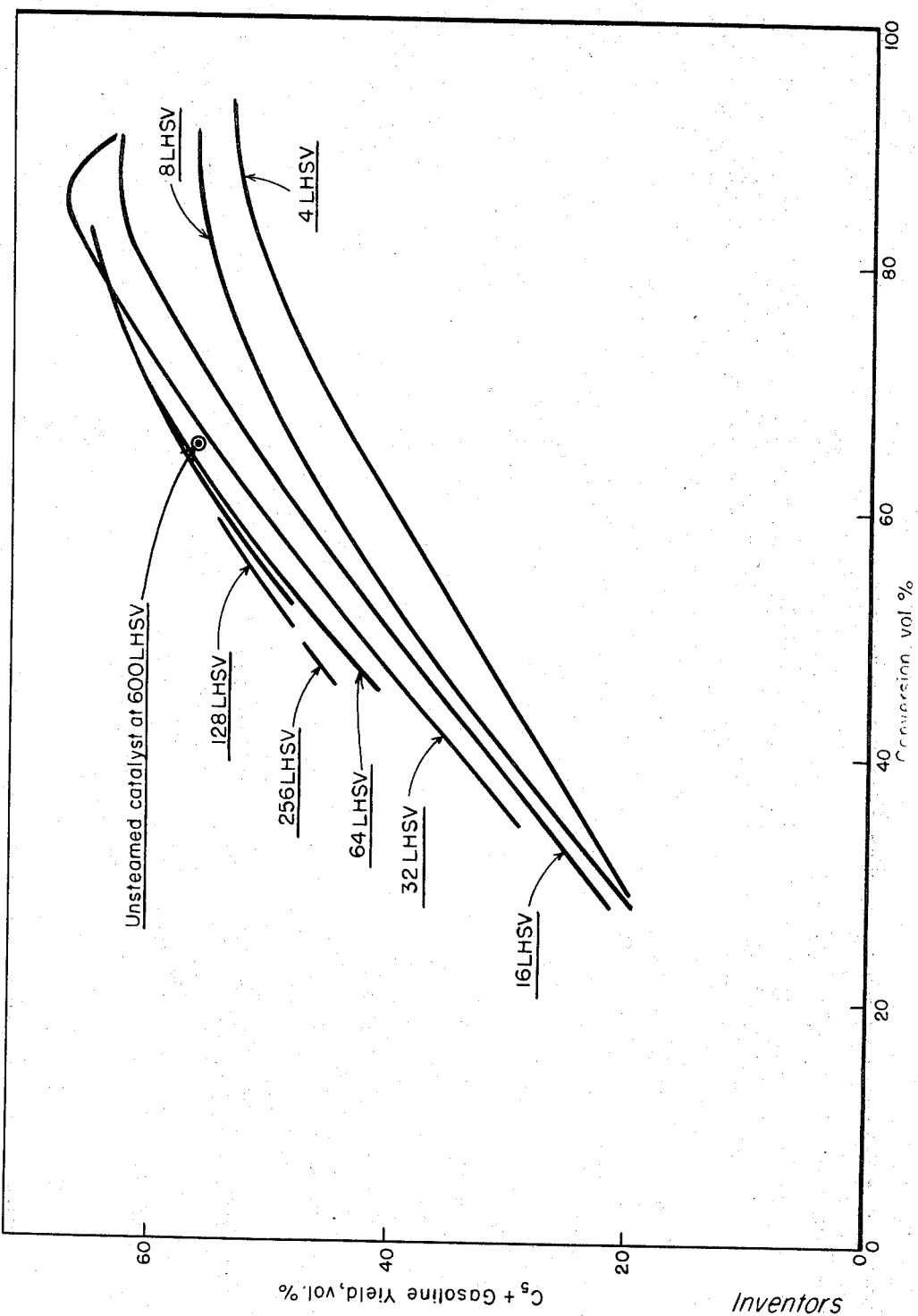

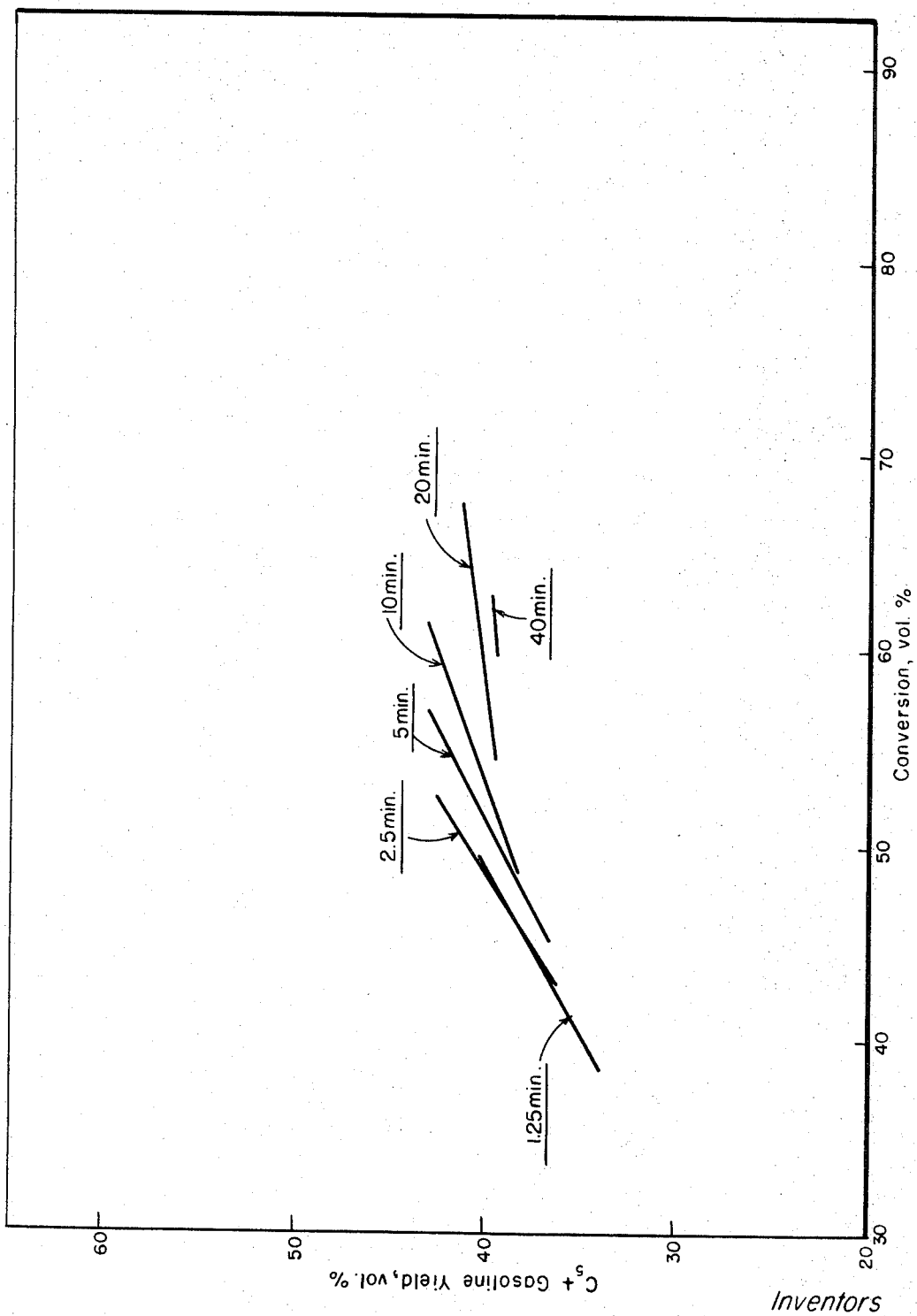

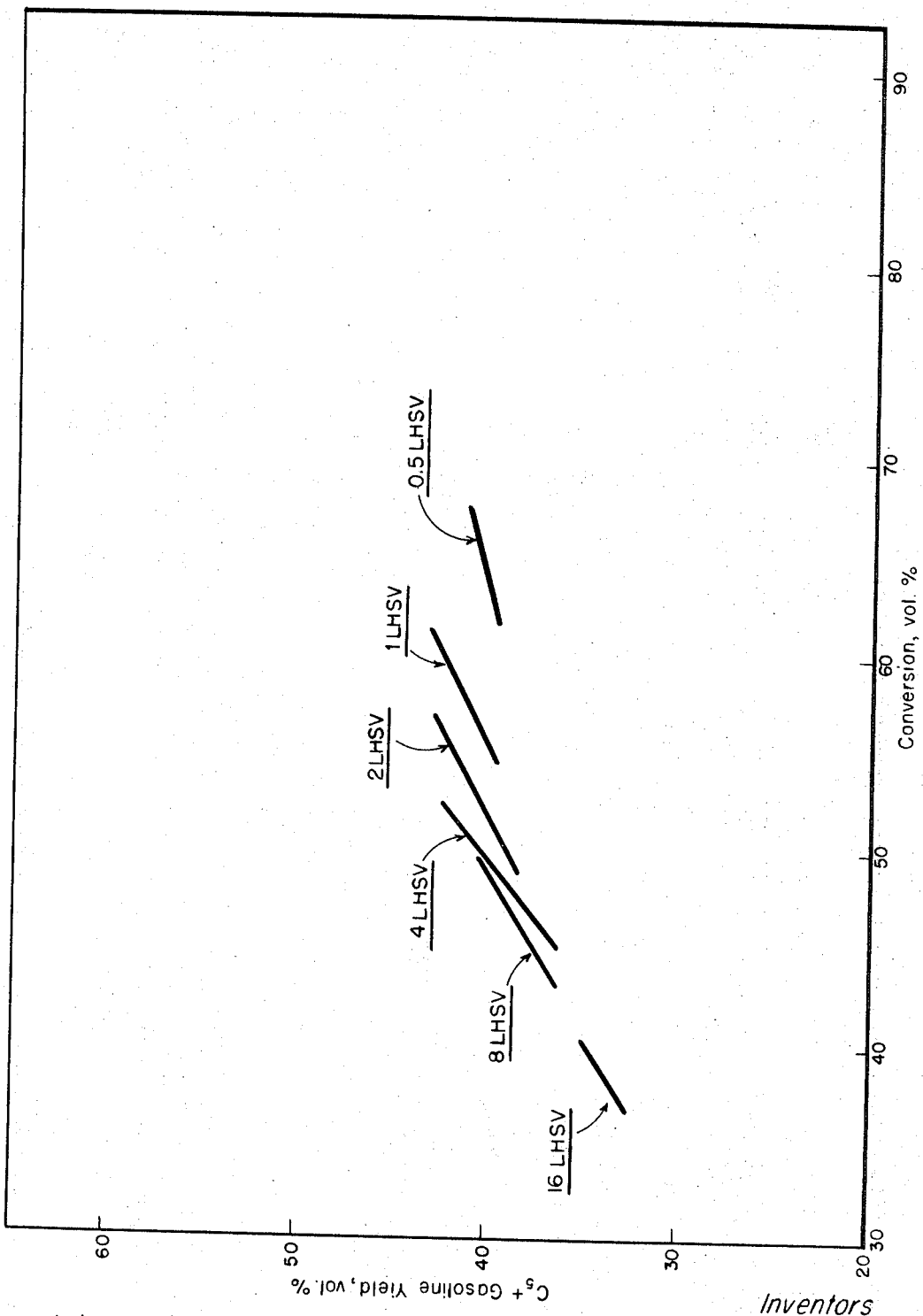

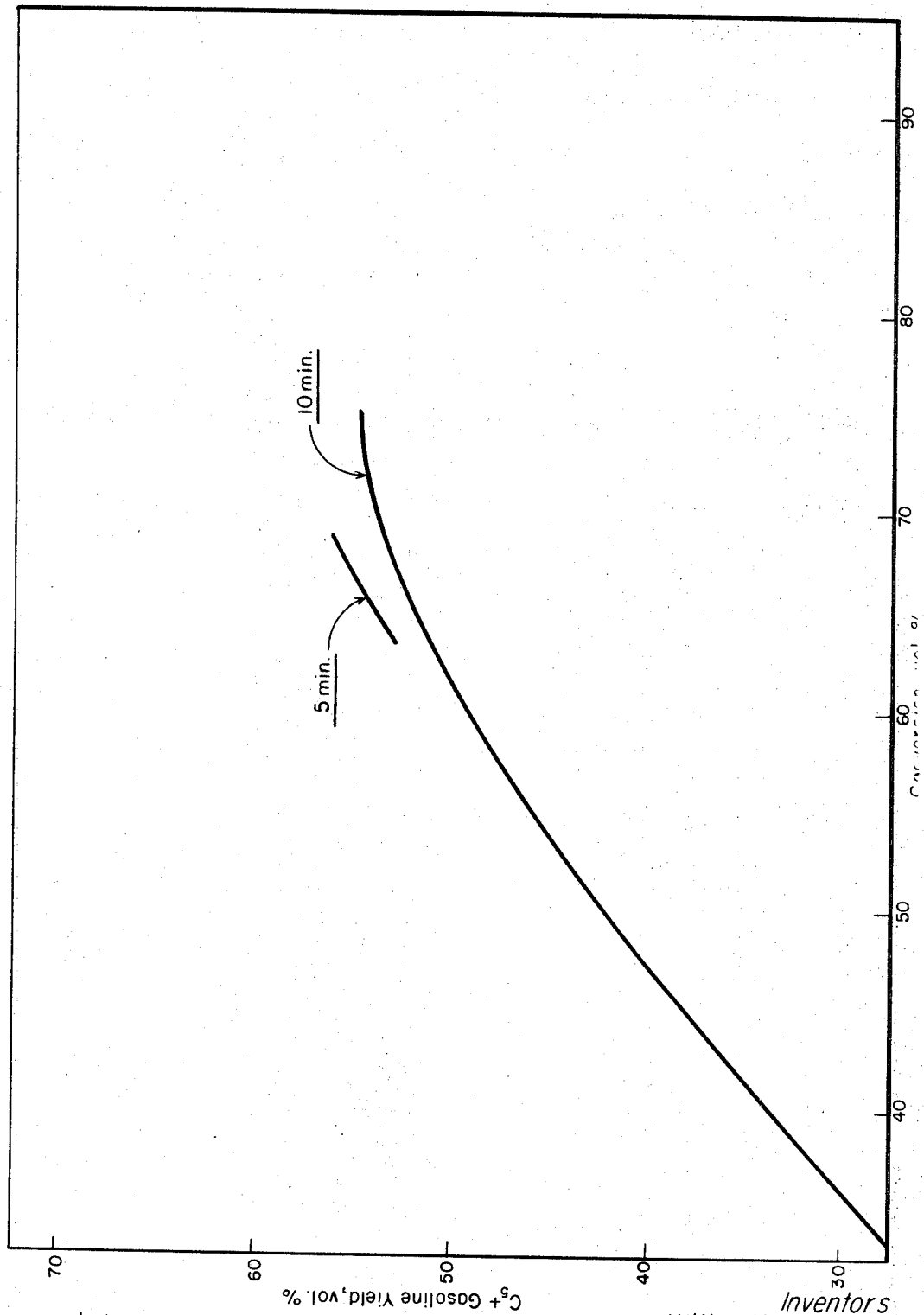

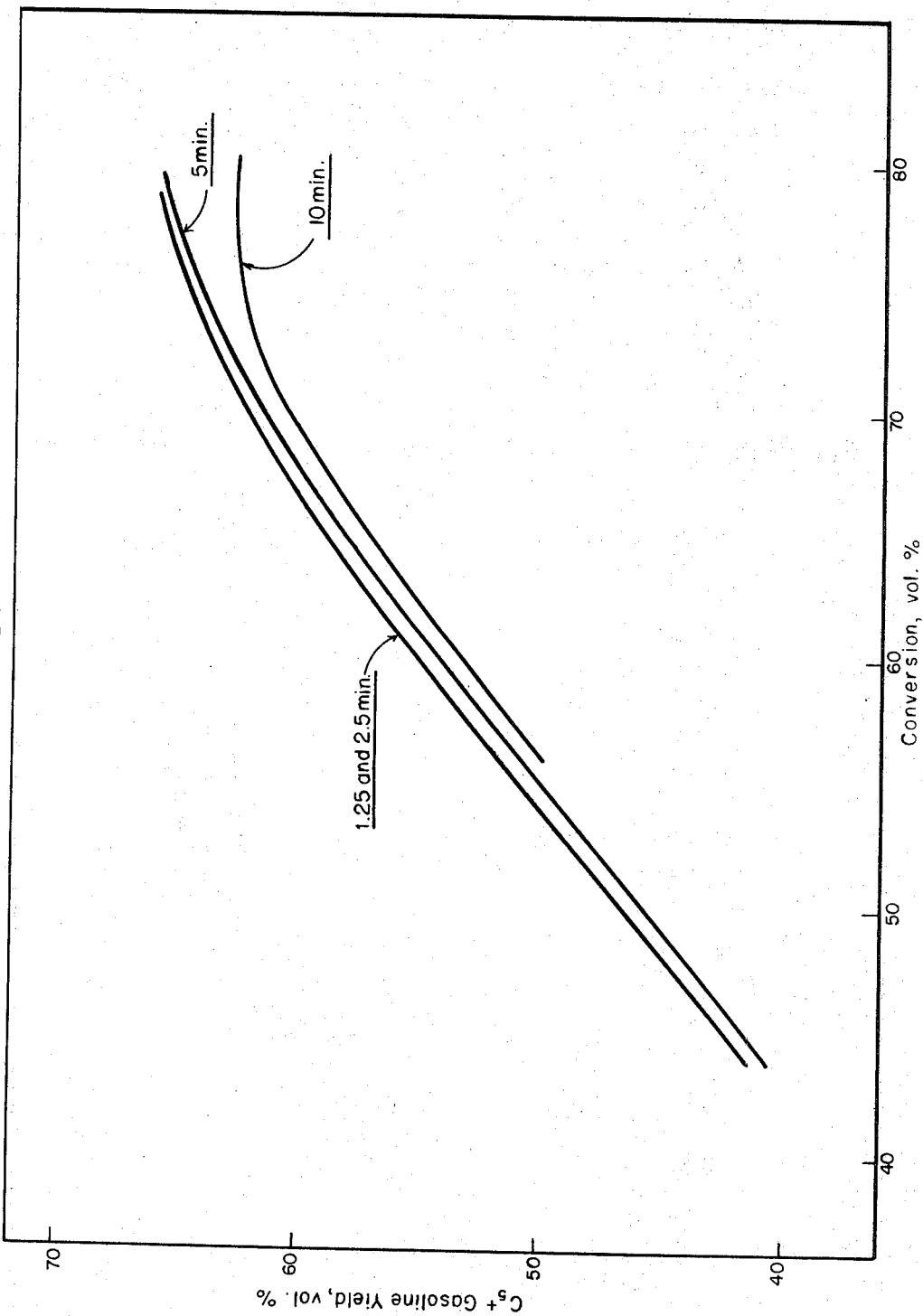

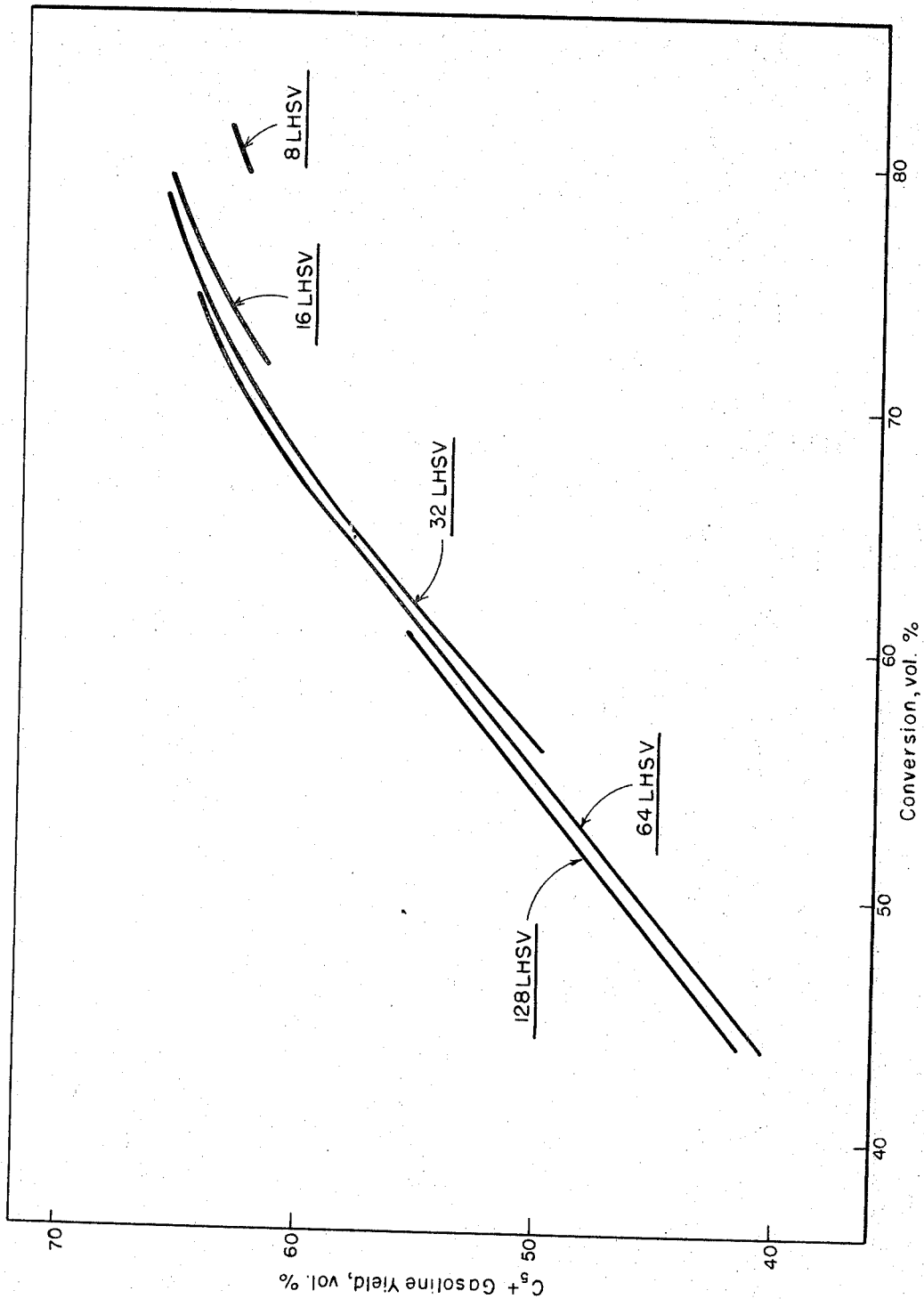

United States Patent Office 3,530,065
Patented Sept. 22, 1970

3,530,065
CATALYTIC CRACKING OF HYDROCARBONS
Wilbur K. Leaman, Medford Lakes, Charles J. Plank, Woodbury, and Bohdan W. Wojciechowski, Glassboro, N.J., assignors to Mobil Oil Corporation, a corporation of New York
Continuation of application Ser. No. 483,617, Aug. 30, 1965. This application June 27, 1968, Ser. No. 752,421
Int. Cl. C10g 11/02
U.S. Cl. 208—120
7 Claims This invention relates to the catalytic conversion of hydrocarbon oils into lower boiling hydrocarbons including $C_5+$ gasoline boiling range hydrocarbons. In one aspect the invention relates to the catalytic cracking of hydrocarbons in the presence of a siliceous conversion catalyst including amorphous siliceous catalysts and those containing a minor or major portion of a material comprising a catalytically active crystalline alumino-silicate. In yet another aspect, the present invention is concerned with an improved method for cracking gas oil boiling hydrocarbons to gasoline boiling hydrocarbons under conditions which maximize the yields of $C_5+$ gasoline boiling hydrocarbons at a conversion level of at least about 50%.

This application is a continuation of Ser. No. 483,617 filed Aug. 30, 1965, now abandoned.

The catalytic cracking of hydrocarbons has been the subject of many patents providing protection for technological developments in the field. These technological developments have been concerned with many aspects of the art including process variables, catalysts, equipment and transfer systems for passing solid particulate material having catalytic activity from one vessel to another. In these prior art patents pertaining to catalyst handling systems and process variables, it has been generally recognized that the catalyst whether naturally occurring or synthetically prepared plays a major role in providing economic conversion of the hydrocarbon feed to useful products. However, it was also recognized that the mere ability to catalyze cracking reactions was of itself insufficient to define a catalyst of commercial significance. Present commercial operations rely for the most part upon a synthetic amorphous silica-alumina composite. However, this does not mean to say that in general the processing conditions used with a particular catalyst cannot be improved upon to afford desired higher yields of useful products along with a relatively smaller yield of less desirable products.

Commercial catalytic cracking has been carried out by contacting a hydrocarbon charge in the vapor, liquid or mixed vapor-liquid state with a suitable cracking catalyst under conditions of temperature, pressure and contact time required to achieve a substantial conversion of the charge to useful products. In these operations the catalyst most usually is moved in a dispersed or dense phase condition in contact with a gasiform material, such as a vaporized hydrocarbon feed, for the accomplishment of the conversion desired. Thereafter, catalyst is subjected to treatment with a gasiform material under conditions to accomplish stripping and regeneration of the catalyst before return thereof to the conversion zone. On the other hand, the catalyst may be held as a fixed catalyst bed in the reactor, and subjected to alternate treatment with hydrocarbon, stripping and regeneration gaseous material. During the catalytic conversion of high boiling hydrocarbons to lower boiling hydrocarbons, the primary reaction is a cracking reaction which is accomplished along with a number of side reactions, such as aromatization, polymerization, alkylation and hydrogen transfer reactions depending on the particular feed employed. The ability of a cracking catalyst to control and to direct the course of these conversion reactions is referred to and known as the catalyst selectivity. As a result of the above reactions a heavy residual hydrocarbonaceous material, often referred to as condensation product, polymer or coke is deposited on the catalyst particles. This heavy hydrogen-deficient deposit, hereinafter referred to as hydrocarbonaceous material or coke, builds up to impair the catalyst conversion efficiency and selectivity to a point where the catalyst is no longer useful for the conversion of hydrocarbons. Fortunately, this catalyst impairment or degradation is not permanent, and the coke-like deposit can be removed by oxidative treatment such as by burning in an oxygen containing atmosphere under carefully controlled conditions. By this oxidative treatment the catalyst activity and selectivity is restored and the catalyst becomes suitable for reuse in the conversion of additional hydrocarbon feed.

It is recognized at this stage of the catalytic cracking art that conversion catalysts may be diffusion limited. That is, the time for hydrocarbon ingress and egress in the catalyst pores may be incompatible with the rate of the cracking reaction. Therefore, it is important to employ a catalyst particle size that is suitable for the system in which it is employed and preferably one which is not inhibited substantialy by diffusion limitations. In this respect it should be recognized that catalyst particles of a fluidizable particle size, generally in the range of from about 0 to about 100 microns and those of a particle size smaller than about 30 mesh size are regarded to be without serious diffusion limitations when employed in normal catalytic cracking reactions to produce gasoline boiling hydrocarbons. This does not mean to say, however, that larger size particles, such as those falling in the range of 4–10 mesh size cannot also be made without an undesired diffusion impairment and be used in the catalytic cracking of hydrocarbons.

Another important catalyst property recognized in the art today resides in the steam stability of the catalyst employed. This steam stability is regarded as a critical property of the catalyst, since during cracking reactions, stripping of the catalyst and subsequent oxidative removal of hydrocarbonaceous material from the catalyst particle is virtually impossible without encountering moisture. To carry out these processing steps without encountering a moisture laden atmosphere particularly in the regeneration steps is very difficult. On the other hand, employing processing conditions which permit the presence and use of steam at elevated temperatures of at least 800° F., and more usually at least about 1000° F., during oxygen regeneration of the catalyst is economically and technically attractive in known or contemplated conversion systems. Therefore, it is evident that it is preferred that the catalysts have desired high activity and selectivity even after contact with steam at temperatures up to about 1400 or 1500° F. In this connection it may be preferred during preparation of the catalyst or before placing the catalyst on stream to subject the catalyst to a preliminary steam treatment. Steam treatment of catalysts may be carried out at temperatures above about 800° F., and as high as about 1500° F., to achieve a desired stabilization of the catalyst activity and selectivity. More usually, steam at a temperature of about 1000° F., to about 1300° F., is used during treatment of the catalyst for an extended period of time of from about 1 hour up to about several hours.

The present invention pertains particularly to the catalytic conversion of hydrocarbons in the presence of a siliceous catalytic cracking composition preferably free of diffusion limitations under conditions to provide a catalyst residence time in the reaction zone in the range of from about 0.25 up to about 5 minutes and preferably from about 0.5 to about 3 minutes. Accordingly, the catalyst residence time is maintained below about 5 minutes and most usually is not above about 3 minutes. In another embodiment, the present invention relates to the method of cracking hydrocarbons in the presence of a siliceous conversion catalyst under conditions to maximize the yield of $C_5+$ gasoline hydrocarbons at substantially any conversion level of at least about 50%. In yet a further embodiment, the present invention relates to the conversion of hydrocarbons to gasoline boiling range products under conditions to retain a nondiffusion limited cracking catalyst containing a catalytically active crystalline aluminosilicate in the hydrocarbon conversion zone for a catalyst residence time not substantially above about 3 minutes and wherein the space velocity employed is at least 5 and generally above about 10.

In practical cracking systems liquid oil charge is passed continuously through a body of catalyst. The oil feed rate can be expressed as liquid hourly space velocity, or volumes of liquid charge fed per hour per volume of solid catalyst, in the reaction zone. Catalyst may also be continuously fed to the system, as in fluid or moving bed cracking systems, or a static bed of catalyst may be used. In the former case, catalyst is removed and stripped and regenerated elsewhere. In the static bed case, the flow of oil feed is stopped or diverted and the catalyst is stripped and regenerated in place. In either situation there is a significant catalyst-to-oil ratio which is the volume of catalyst divided by the volume of liquid oil processed over this volume of catalyst in a single cracking stage before the catalyst is regenerated. In the case of moving catalyst systems, the catalyst-to-oil ratio is merely the charge rate of catalyst to the reactor divided by the charge rate of gas oil to the reactor (expressed as liquid volume). In the static bed case the catalyst-to-oil ratio is the ratio of the volume of catalyst in the reactor to the volume of oil charge (as liquid) processed over that volume of catalyst before regeneration. Catalyst-to-oil ratio can be expressed on a weight basis.

It is evident therefore that, in the cracking reaction, there is an average oil contact time, which is the average length of time the oil is within the catalyst zone. There is also an average catalyst residence time in the reactor. In the case of moving catalyst systems this is obtained by dividing the volume of catalyst in the reaction zone by the catalyst feed rate to this zone. In the case of static bed systems the catalyst residence time is just the period of oil flow through the reaction zone prior to interruption for stripping and regeneration.

It is evident, then, that

Catalyst residence time (in hours) $T$ $$= \frac{1}{(LHSV) \ (cat/oil \ by \ volume)}$$

or

Catalyst residence time (minutes) $T$ $$= \frac{60}{(LHSV) \ (cat/oil \ by \ volume)}$$

Using the latter equation, it is evident that for the preferred catalyst residence time ($T$) of 0.25 up to about 5 minutes that the product value of liquid hourly space velocity and catalyst-to-oil volume ratio becomes a range extending from about 12 up to about 240.

In the method of this invention, the hydrocarbon cracking step is carried out under catalytic cracking conditions which include a mix temperature of hydrocarbon feed and catalyst at the inlet to the reaction zone in the range of from about 800° F., to about 1200° F., and preferably from about 850° F., to about 1000° F. The pressure employed may be substantially any pressure desired or that required to obtain a desired flow of reactants and catalyst through the system in which employed. The pressure therefore may be selected from within the range of sub-atmospheric pressures up to several atmospheres of pressure.

The catalyst-to-oil ratio employed may be successfully varied over a relatively wide range of from about 0.01 to about 30 but is preferably maintained as low as is consistent with the desired conversion, but not so low that when multiplied by the LHSV value used therewith that the product value falls outside the numerical range, 12 to about 240. Accordingly, the (LHSV), liquid hourly space velocity, is maintained at a value greater than about 5 and most usually at a value of at least about 10 and higher. In view of the above relationship of operating conditions it is clear that the present invention is concerned particularly with high space velocity operations in an operating arrangement which permits a catalyst residence time preferably from about 0.5 to about 3 minutes. The fact that the catalyst residence time should be as stated above will be more clearly evident upon study of the figures presented herewith.

The catalysts employed in the method of this invention may be selected from a wide variety of siliceous conversion catalysts known in the art. That is, the catalyst may be substantially any silica-alumina, silica-magnesia, silica-zirconia, silica-alumina-bovia or others, cracking catalyst whether in the amorphous or crystalline form and mixtures thereof. It is preferred, however, that the catalyst be a high activity material for cracking hydrocarbons and such catalysts may be had by employing a catalytically active crystalline alumino-silicate material either alone or in combination with a matrix material which is substantially inert or of a lower cracking activity than the crystalline alumino-silicate material combined therewith. This does not mean to say that an amorphous cracking catalyst cannot be employed alone even though it is preferred that the catalyst employed contains an amount of active crystalline alumina-silicate material.

The method of preparing siliceous conversion catalysts has been the subject of numerous patents, and the siliceous conversion catalysts which may be employed to advantage in the method of this invention are not limited to any particular method of catalyst preparation except that the catalyst be active for the conversion of hydrocarbon by catalytic cracking. U.S. Pat. 3,140,249 is one patent among many which describes suitable hydrocarbon conversion catalysts and methods of preparation that may be employed to form the catalysts employed in this invention.

Having thus provided a general description of the improved method of this invention reference is now had by way of example to the attached figures which were formed from a plot of available data and help to provide a more clear understanding of this invention. The figures are plots of data obtained for various catalyst compositions comprising:

(1) Relatively pure rare earth exchanged crystalline aluminosilicate prepared from zeolite "X";

(2) Relatively pure rare earth exchanged crystalline aluminosilicate prepared from zeolite "Y";

(3) 10% by weight of rare earth exchanged zeolite "Y" dispersed in an $SiO_2$ matrix formed in a particle size of (a) 30–60 mesh and (b) 4–10 mesh beads;

(4) A 30–60 mesh crushed bead which is primarily an amorphous silica-alumina cracking catalyst;

(5) A bead catalyst of 4–10 mesh comprising an amorphous silica-alumina component in which about 10% by weight of a rare earth exchanged crystalline aluminosilicate material has been dispersed.

The data forming the figures herein-presented were obtained from experiments performed in a CAT-C test unit employing a wide range Mid-Continent gas oil as charge stock. In the standard CAT-C, 200 cc. of 4–10 mesh catalyst is used at 2LHSV, 3 cat/oil ratio and a temperature of about 900° F. Since catalyst residence time is the reciprocal product of LHSV and cat/oil ratio, the above Cat-C operating conditions correspond to 10 minutes on-stream. These conditions represent the laboratory simulation of commercial TCC operation in which catalyst residence times vary from 7 to 15 minutes. However, to develop the data presented in the figures required the use of smaller quantities of catalyst. Therefore, the catalyst was distributed in quartz particle diluent material which was used at the same particle size as the catalyst particle. Space velocity, catalyst-to-oil ratio and catalyst residence time were all varied. Temperature was maintained at about 900° F.

velocity how gasoline yield varies with conversion. Again, the benefits in gasoline selectivity resulting from the use of high space velocities are illustrated.

FIG. XI on the other hand is a plot of the data obtained when cracking aver 30–60 mesh REX catalyst and shows these data plotted as lines of constant catalyst residence time to illustrate how the yields of $C_5+$ gasoline vary for different conversion levels. The curves of FIG. XI are believed to be clearly self-explanatory for showing TABLE 1.—EFFECTS OF CATALYST RESIDENCE TIME ON STATIC-BED CRACKING OVER 30-60 MESH REY NOMINAL 900° F.

| Time on stream, min. | L.h.s.v., hr. | Cat./oil, vol./vol. | Cracking of full range mid-continent gas oil | | | | |
|---|---|---|---|---|---|---|---|
| | | | Conversion, vol. percent | $C_5+$ gasoline, vol. percent | $C_4$ vol. percent | Dry gas, wt. percent | C, wt. percent |
| 1.25 | 256 | 0.1875 | 42.9 | 41.9 | 5.5 | 2.3 | 0.7 |
| | 128 | 0.375 | 62.9 | 58.7 | 10.0 | 3.5 | 1.5 |
| | 64 | 0.75 | 74.3 | 66.4 | 13.0 | 4.4 | 2.6 |
| | 32 | 1.5 | 82.8 | 69.8 | 15.5 | 6.6 | 4.5 |
| 2.5 | 128 | 0.1875 | 50.8 | 48.9 | 7.3 | 2.5 | 0.7 |
| | 64 | 0.375 | 66.1 | 61.5 | 10.8 | 3.9 | 1.1 |
| | 32 | 0.75 | 77.8 | 68.6 | 15.1 | 5.0 | 2.2 |
| | 16 | 1.5 | 83.4 | 68.9 | 17.0 | 6.4 | 5.3 |
| 5 | 64 | 0.1875 | 48.6 | 46.4 | 7.3 | 2.9 | 0.4 |
| | 32 | 0.375 | 66.2 | 61.4 | 10.5 | 4.2 | 1.1 |
| | 16 | 0.75 | 78.4 | 68.4 | 14.6 | 6.0 | 2.2 |
| | 8 | 1.5 | 84.1 | 66.6 | 18.9 | 8.9 | 3.8 |
| 10 | 32 | 0.1875 | 55.7 | 51.9 | 8.7 | 3.8 | 0.6 |
| | 16 | 0.375 | 72.1 | 63.4 | 13.2 | 5.9 | 1.6 |
| | 8 | 0.75 | 79.6 | 66.4 | 16.1 | 7.1 | 2.6 |
| | 4 | 1.5 | 85.3 | 64.6 | 20.6 | 9.3 | 5.6 |
| 20 | 16 | 0.1875 | 55.7 | 49.7 | 10.1 | 4.8 | 0.5 |
| | 8 | 0.375 | 72.4 | 61.4 | 14.9 | 6.6 | 1.3 |
| | 4 | 0.75 | 79.9 | 63.3 | 17.5 | 8.7 | 3.0 |
| 40 | 8 | 0.1875 | 61.1 | 52.7 | 11.6 | 6.2 | 0.5 |
| | 4 | 0.375 | 70.8 | 58.3 | 14.2 | 8.1 | 1.5 |
| 80 | 4 | 0.1875 | 58.9 | 48.6 | 11.5 | 7.0 | 1.0 |

Table 1 above presents some of the data obtained in an investigation concerned with cracking over a crystalline alumino silicate. These data were employed to develop the curves of FIGS. I through V hereinafter discussed.

FIGS. I through IV are plots of the data obtained when cracking over a 30–60 mesh REY (rare earth exchanged zeolite "Y"). These data are plotted with lines of constant catalyst residence time to illustrate how product distribution varies with conversion. Space velocity (LHSV) is increased and catalyst/oil ratio is reciprocally decreased to generate each line of constant catalyst residence time. The curves emphasize the benefit to gasoline selectivity from using short catalyst residence time.

FIG. V shows the same data plotted with lines of constant space velocity and relates conversion and gasoline yield. To generate each line of constant space velocity, catalyst residence time is increased and catalyst/oil ratio is reciprocally decreased. FIG. V illustrates the benefits from use of high space velocities for any given conversion level.

FIGS. VI through IX are plots of the data obtained when cracking over a 30–60 mesh catalyst comprising 10% by weight of REY (rare earth exchanged "Y" type zeolite) distributed in a silica-matrix. These data are also plotted with lines of constant catalyst residence time to illustrate how product distribution varies with conversion. Again space velocity (LHSV) is increased and catalyst/oil ratio is reciprocally decreased to generate each curve. That is, FIG. VI shows that a catalyst residence time of 5 minutes and higher causes a significant decrease in $C_5+$ gasoline yields for conversions up to about 80 vol. percent, and FIG. VII shows that the $C_4$ vol. percent yields are significantly increased at catalyst residence times of 5 and higher.

FIG. VIII, on the other hand, shows the significant increase in dry gas yields as the catalyst residence time is increased from 1.25 minutes to 5 minutes and on to about 10 minutes. It is clearly evident from these data that the catalyst residence time should be less than about 5 minutes to maximize the yields of $C_5+$ gasoline products and minimize the yields of $C_4$ and dry gas conversion products.

FIG. X, like FIG. V, shows the lines of constant space velocity how gasoline yield varies with conversion. Again, a decrease in gasoline yields at any given conversion level as the catalyst residence time exceeds a value of 5 minutes and that at conversion levels above about 60 vol. percent, the catalyst residence time should be less than about 5 minutes.

FIG. XII presents the same data obtained when cracking over a 30–60 mesh REX catalyst. The curves presented represent lines of constant space velocity as identified and are self-explanatory in showing the marked and unexpected gasoline yield improvement with increase in space velocity.

FIG. XIII presents the results obtained when cracking over a 30–60 mesh catalyst comprising substantially equilibrium amorphous silica-alumina catalytic cracking material. The curves presented represent lines of constant time on stream as identified and show among other things the marked and unexpectant gasoline yield improvement for different curves of constant catalyst residence time.

FIG. XIV on the other hand presents a cluster of curves which shows among other things the effect of space velocity on gasoline yield when cracking with a 30–60 mesh catalyst comprising substantially equilibrium amorphous silica-alumina cracking catalyst. In other words, for a given conversion the gasoline yield is a function of space velocity.

FIG. XV is a plot of the data obtained when cracking over 4–10 mesh (bead) form catalyst comprising REX in a silica-alumina matrix and shows the effects obtained for 5 minutes and 10 minutes catalyst residence time on gasoline yields. It is clearly evident from the curves obtained that the $C_5+$ gasoline yields are considerably higher for a catalyst residence time of 5 minutes than were obtained for a catalyst residence time of 10 minutes.

FIG. XVI presents the results obtained plotted as lines of constant catalyst residence time to show the effect on gasoline yields when cracking over a 4–10 mesh bead form REY (10%) in a silica matrix cracking catalyst. These curves show that for a given conversion level, $C_5+$ gasoline yields increase as the catalyst residence time is decreased from 10 minutes to 1.25 minutes.

FIG. XVII shows with lines of constant space velocity the effect on gasoline yields when cracking over a 4–10 mesh bead form REY (10%) in a silica matrix cracking catalyst. It is also clear from these curves that, for any given conversion level, $C_5+$ gasoline yields increase with increases in space velocity.

Having thus provided a description of applicants' invention and provided specific examples pertaining thereto in the form of curves obtained by plotting experimental data, it is to be understood that no undue restrictions are to be imposed by reason thereof except as defined by the following claims.

What is claimed is:

1. In the cracking of gas oils to gasoline at a conversion level of at least about 50% employing high space velocities and a stream stable rare earth exchanged crystalline aluminosilicate at a temperature in the range of 850° F. to 1000° F., the method for improving the $C_5+$ gasoline selectivity which comprises employing a gas oil charge liquid hourly space velocity in the reaction zone within the range of from about 32 to about 256 v./hr./v. and maintaining the residence time of the catalyst in the reaction zone within the range of 1 to 3 minutes.

2. The method of claim 1 wherein the cracking catalyst comprises at least 10 percent by weight of active crystalline aluminosilicate.

3. The method of claim 1 wherein the charge liquid hourly space velocity is within the range of 64 to 128.

4. The method of claim 1 wherein the conversion level per pass is maintained above about 50 volume percent and the charge liquid hourly space velocity is maintained within the range of 128 to 256.

5. The method of claim 1 wherein the crystalline aluminosilicate is a rare earth exchanged zeolite Y.

6. The method of claim 1 wherein the crystalline aluminosilicate is a rare earth exchanged zeolite X.

7. The method of claim 1 wherein 10 percent by weight of the zeolite is dispersed in a $SiO_2$ matrix.

References Cited

UNITED STATES PATENTS

| | | | |
|---|---|---|---|
| 3,140,251 | 7/1964 | Plank et al. | 208—120 |
| 3,198,729 | 8/1965 | Payne | 208—168 |
| 3,357,916 | 12/1967 | Smith | 208—120 |

OTHER REFERENCES

Chemistry of Petroleum Hydrocarbons, vol. 2, pp. 175 to 180, Reinhold Pub. Corp., New York, 1955.

DELBERT E. GANTZ, Primary Examiner

A. RIMENS, Assistant Examiner